(12) United States Patent
Nguyen Van

(10) Patent No.: US 12,497,745 B2
(45) Date of Patent: Dec. 16, 2025

(54) MODULAR FLOOD BARRIER

(71) Applicant: CUIRASSIER, Futuroscope (FR)

(72) Inventor: Luc Nguyen Van, Futuroscope Chasseneuil (FR)

(73) Assignee: CUIRASSIER, Futuroscope (FR)

( * ) Notice: Subject to any disclaimer, the term of this patent is extended or adjusted under 35 U.S.C. 154(b) by 88 days.

(21) Appl. No.: 18/293,138

(22) PCT Filed: Jul. 27, 2022

(86) PCT No.: PCT/EP2022/071066
§ 371 (c)(1),
(2) Date: Jan. 29, 2024

(87) PCT Pub. No.: WO2023/006811
PCT Pub. Date: Feb. 2, 2023

(65) Prior Publication Data
US 2025/0075456 A1    Mar. 6, 2025

(30) Foreign Application Priority Data

Jul. 30, 2021 (WO) .................. PCT/IB2021/000537

(51) Int. Cl.
*E02B 3/10* (2006.01)
(52) U.S. Cl.
CPC .................... *E02B 3/108* (2013.01)
(58) Field of Classification Search
CPC ............. E02B 3/108; E02B 3/04; E02B 3/106
See application file for complete search history.

(56) References Cited

U.S. PATENT DOCUMENTS

| 4,091,624 | A | * | 5/1978 | Steinke | .................. E02B 8/045 405/96 |
| 5,040,919 | A | | 8/1991 | Hendrix | |
| 6,296,420 | B1 | | 10/2001 | Garbiso | |
| 6,413,014 | B1 | * | 7/2002 | Melin | .................. E02D 29/025 405/113 |

(Continued)

FOREIGN PATENT DOCUMENTS

| FR | 3054572 A1 | 2/2018 |
| WO | 2021044180 A1 | 3/2021 |

OTHER PUBLICATIONS

Nguyen, Van Luc; Machine Translation FR 3054572; All; 2018 (Year: 2018).*

(Continued)

*Primary Examiner* — Benjamin F Fiorello
(74) *Attorney, Agent, or Firm* — Maier & Maier, PLLC

(57) ABSTRACT

A module adapted to form a protective barrier against liquid runoff or flooding, the module being movable between a working position and a stowed position, including a base adapted to anchor the module to the ground; a retention member mounted to the base to extend vertically relative to the base when the module is in the working position, and extend parallel to the base when the module is in the stowed position; a flexible waterbag fixed to the retention member, wherein the waterbag is supported by the base and adapted to receive liquid passing through an opening of the retention member when the module is in the working position, and the waterbag is contained in the box when the module is in the stowed position.

18 Claims, 13 Drawing Sheets

(56) References Cited

U.S. PATENT DOCUMENTS

| | | | | |
|---|---|---|---|---|
| 6,679,654 B1* | 1/2004 | Wittenberg | ............ | E02B 3/108 256/13 |
| 6,840,711 B1* | 1/2005 | Martinez | ................ | E02B 3/106 405/15 |
| 9,181,669 B2* | 11/2015 | Stroup | ...................... | B64F 5/30 |
| 2010/0329785 A1* | 12/2010 | Nero | ...................... | E02B 3/106 405/16 |
| 2011/0052323 A1* | 3/2011 | Mun | ...................... | E02B 3/106 405/114 |
| 2016/0289908 A1* | 10/2016 | Krogenes | ................ | E02B 3/106 |
| 2020/0208371 A1* | 7/2020 | Angeloff | ................ | E02D 19/04 |
| 2022/0010508 A1* | 1/2022 | Abeles | ..................... | E01F 7/04 |

OTHER PUBLICATIONS

International Search Report and Written Opinion, issued Nov. 4, 2022, in corresponding International Application No. PCT/EP2022/071066, 9 pages.

\* cited by examiner

MODULAR FLOOD BARRIER

FIELD

This disclosure generally pertains to the field of protective barriers against floods and water runoff.

BACKGROUND

Flooding is an overflow of water from water bodies such as rivers, lakes, or oceans that submerges land that is usually dry. Flooding may occur as water overtops or breaks levees, resulting in some of that water escaping its usual boundaries.

In an areal flood, surface runoff (also known as overland flow) may occur as rainwater accumulates on flat or low lying land. This may be caused by saturated soil, by rain arriving more quickly than the soil can absorb it, or by impervious surfaces (roofs and pavements) sending their runoff to surrounding soil which cannot absorb all of it.

A barrier may be placed temporarily around a specific area to keep floodwater or water runoff from entering an area to be protected.

Various systems exist for creating barriers to protect homes, buildings or grounds against the risk of flooding and surface runoff, but also against overflows of sludge or industrial liquid.

In some systems, the barrier may be formed by assembling several modules together. The modules can be conveyed separately and assembled to each other on site. It is therefore possible to erect a protective barrier adapted to the specific area to be protected.

In the modular system described in W0/2021/044180, it is proposed to load each module with incoming water, so that stability and anchoring are obtained naturally by the weight of the liquid entering and staying in each module. When not in use, each module may be reassembled into a stowed position, facilitating transport and storage.

However, the assembly and disassembly of the modules described in W0/2021/044180 between the stowed position and a working position is relatively complex. The number of components necessary for assembling each module is relatively high, resulting in time consuming assembly and disassembly processes. This can be especially detrimental when the modules are to be deployed in an emergency situation.

There is therefore a need for a simplified module for implementation in a protective barrier.

SUMMARY

It is proposed a module adapted to form a protective barrier against liquid runoff or flooding, the module being movable between a working position and a stowed position, the module comprising
- a base adapted to anchor the module to the ground;
- a retention member comprising a wall adapted to retain liquid and an opening adapted to let liquid pass therethrough, wherein the retention member is mounted to the base to: extend vertically relative to the base when the module is in the working position, and extend parallel to the base to form a box with the base when the module is in the stowed position;
- a flexible waterbag fixed to the retention member, wherein the waterbag is supported by the base and adapted to receive liquid passing though the opening when the module is in the working position, and the waterbag is contained in the box when the module is in the stowed position.

Thanks to this arrangement, it is proposed a simple and reliable construction for a module to be implemented in a protective barrier. In the working position, the module may be suitably stable and anchored to retain water on one side of the module. In the stowed position, the module may be a compact box, suitable for transport and storing. Moving the module from the stowed to the working position comprises moving the retention member and deploying the waterbag. No additional mounting or fixing of the waterbag is involved. The deployment of the module may be quick, and suited for emergency situations.

Further, the flexible waterbag can be very large and receive large quantities of liquid. The module can be very stable in the working position while remaining compact in the stowed position.

The following features, can be optionally implemented, separately or in combination one with the others.

The retention member may be at least rotatably mounted to the base. The retention member may be folded over the base when switching between the stowed position and the working position. The module is simple and quick to assemble or disassemble.

The base may comprises a pin configured to be clipped into an elongated hole of the retention member. Switching between the stowed and the working position may be a slide and pivot motion of the base relative to the retention member. The joint between the base and the retention member is simple and may be easily implemented.

The waterbag may be embedded with a reinforcement adapted to compress when the module is moved from the working position to the stowed position. The waterbag is not dismantled when stowing the module. The waterbag may be stored into the box simply by compressing the waterbag against the retention member. The reinforcement participates in the satisfactory folding of the waterbag into the module.

The waterbag may be cylindrical, and the reinforcement may be an arcuate member, preferably the reinforcement may be a spiral reinforcement. Such a shape and construction of the reinforcement improves the reliability of the folding of the waterbag into the box. In addition, such a shape and construction improves the rigidity of the waterbag.

The wall of the retention member may comprise v-shaped ribs adapted to come into contact with the liquid to be retained when the module is in the working position. Such ribs generate disturbances in the liquid and/or the wind coming into contact with the wall of the retention member, so that the force applied by the liquid and/or the wind is reduced. Such ribs also improve the rigidity of the wall, even if the wall is relatively thin and lightweight.

The module may comprise a grate fitted in the opening of the retention member. The grate may prevent objects carried by the liquid to pass through the opening of the retention member and flow into the waterbag.

The grate may be removably mounted to the opening, preferably the grate may be removed by rotation of the grate relative to the retention plate. It is therefore possible to remove the grate from the module, for access to the waterbag. The waterbag and/or the grate may be easily maintained and cleaned.

The module may further comprise a rear plate removably mounted to an extremity of the waterbag distant from the retention member, where in the rear plate is contained in in the box when the module is in the stowed position. The rear plate may be used to connect various components such as sensors, valves and/or pipes. Further, the rear plate may be removed and an additional waterbag may be mounted to the module, forming an extension. The rear plate may be stored in the box when the module is in the stowed position. The rear plate may be fitted into the box as a result of the folding of the waterbag. No dismantling of the rear plate may be involved, and moving the module from the stowed to the working position remains quick and simple.

The module may further comprise a connecting plate, wherein: the connecting plate is mounted to the retention member to extend along a lateral side of the retention member when the module is in the working position, and the connecting plate is adapted to fit into a slot formed in the base when the module is in the stowed position. In the working position, the connecting plate enables multiple modules to be connected together and form a protective barrier. The use of a connecting plate, separate from the retention member, provides more flexibility in the orientation of neighboring modules as opposed to directly mounting a retention member to another. In the stowed position, the connecting plate may be slid into the slot for compact storage. Such storage may prevent loose components of the module from being lost during transport or storage.

In the working position, the connecting plate may be rotatably mounted about an axis parallel to the lateral side of the retention member and the module further comprises a pressure latch adapted to lock the connecting plate in a desired orientation. Such a mounting of the connecting plate provides flexibility in the orientation between two consecutive modules. In addition, the pressure latch enables flexibility in the strength of the interlock between the connecting plate and the retention member. A security system may be implemented.

The module may further comprise first sealing means extending along the lateral side of the retention member and configured to be compressed by the connecting plate, second sealing means extending along an edge of the connecting plate configured to be compressed against the ground, and/or third sealing means extending along an side of the retention member configured to be in contact with the ground. The connection between consecutive modules may be satisfactorily sealed, and water may be prevented from leaking across the protective barrier.

The module may further comprise at least one support leg, wherein the support leg is mounted to the base and the retention member when the module is in the working position; and the supportleg is mounted to a lateral side of the retention member to extend along the lateral side of the retention member when the module is in the stowed position. The supportleg improves the rigidity of the module when the module is in the working position. The supportleg can also be used to manipulate the module (such as moving it during use). The supportleg can be stored attached to the box, preventing loose components from being lost or separated from the rest of the module.

The module may further comprise a biasing mechanism mounted to the base, and the biasing mechanism may comprise an elastic member configured to bias the supportleg towards the retention member. When no force is applied on the retention member (ie no liquid is acting on the retention member), the elastic member may generate a forward inclination of the retention member relative to the base. Such an inclination may prevent play due to the clearance between different parts. The inclination may also improve the sealing between the ground and the bottom side of the retention member. When liquid is acting on the retention member, the force of the liquid causes the support member to act against the elastic member. The retention member may be positioned to extend vertically relative to the ground and be securely held in place.

The support leg is symmetrical about a cross sectional plane of the support leg. The deployment and stowing of the module may be facilitated, as the supportleg may be mounted in any orientation.

The base may comprise a weakened portion onto which the supportleg is mounted. Thus, in case of an impact on the retention member, the weakened portion may break. The weakened portion provides damping and prevents the breakage of other parts of the module. The module may remain operational following an impact.

The module may further comprise at least anchoring hook arranged on a lateral side of the retention member and adapted to cooperate with an anchoring peg pushed into the ground and/or comprising a wall joint arranged on a lateral side of the retention member and adapted to fix the module to a wall or building.

In another aspect, it is proposed a protective barrier against liquid runoffs or floods, comprising two or more modules, each module being movable between a working position and a stowed position, each module comprising
 a base adapted to the anchor module to the ground;
 a retention member comprising a wall for retaining liquid and an opening for letting liquid pass there through, wherein the retention member is mounted on the base to: extend vertically relative to the base when the module is in the working position, and extend parallel to the base to form a box with the base when the module is in the stowed position;
 a flexible waterbag fixed to the retention member, wherein the waterbag is supported by the base and adapted to receive liquid passing though the opening when the module is in the working position, and the waterbag is contained in the box when the module is in the stowed position; and;
 a connecting plate configured to connect the module to a second module when the module is in the working position.

BRIEF DESCRIPTION OF DRAWINGS

Other features, details and advantages will be shown in the following detailed description and on the figures, on which.

DETAILED DESCRIPTION

Figure 1:
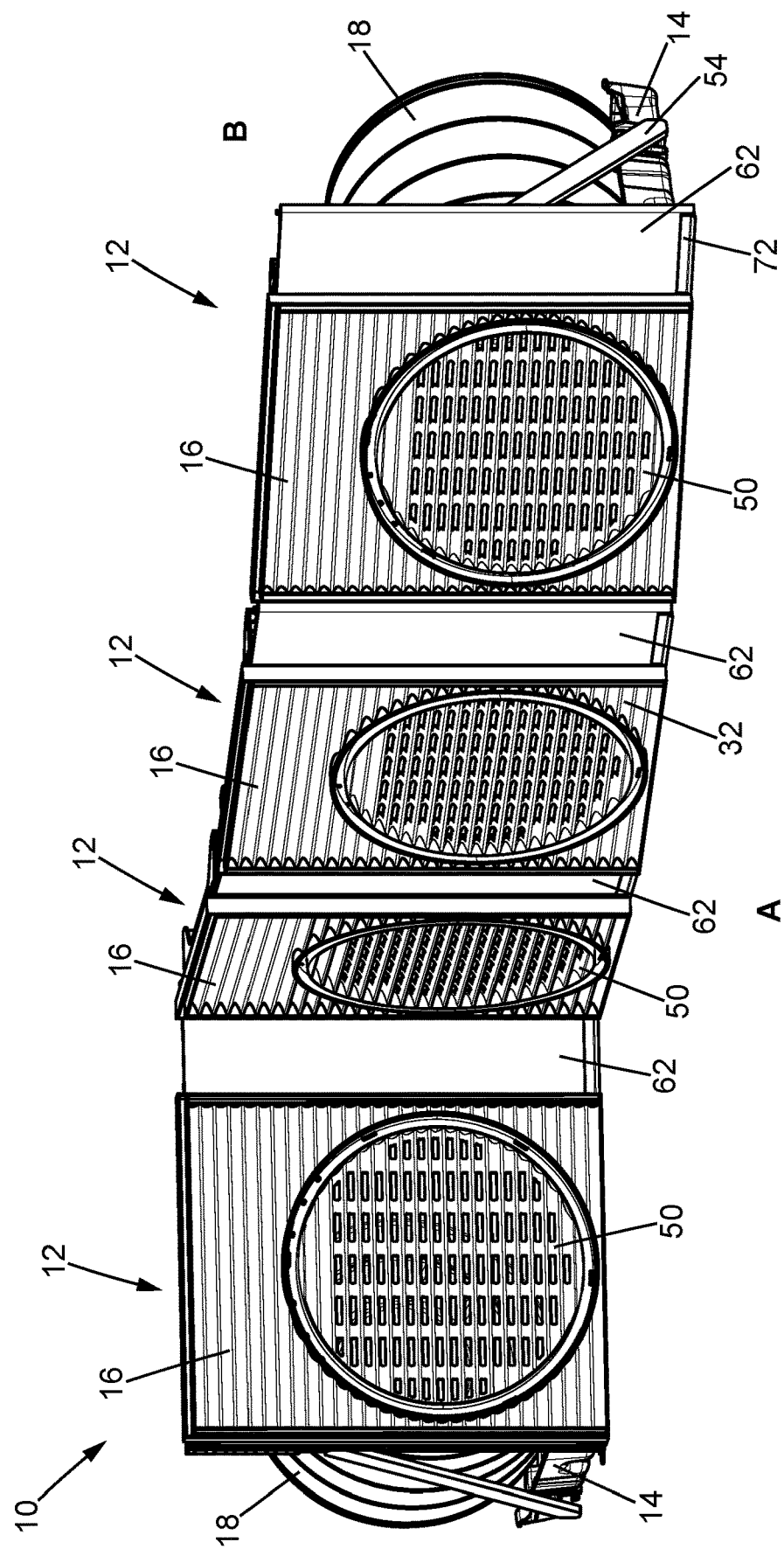
FIG. 1 is a perspective view of a protective barrier, according to an embodiment.

FIG. 1 illustrates a protective barrier 10 adapted to retain a liquid on one side of the protective barrier 10. By liquid, it is understood essentially liquid, more or less viscous fluids, such as water, sludge, or industrial liquid. The protective barrier 10 can be used in a wide variety of situations, to protect a specific area, a building and the like.

As shown in FIG. 1, the protective barrier 10 comprises a plurality of modules 12 connected together to form a cohesive unit. The modules 12 are independent from one another but can be assembled together to form the protective barrier 10. As illustrated in FIG. 1, two neighboring modules 12 may be assembled in different orientations from each other. The barrier 10 formed with the modules 12 may be a linear barrier, or a convex or concave barrier 10. The modules 12 may be orientated relative to one another depending on the specific area to be protected.

Each module 12 generally comprises a base 14, a retention member 16 and a waterbag 18. Each module 12 may adopt a working position and a stowed position.

Figure 2:
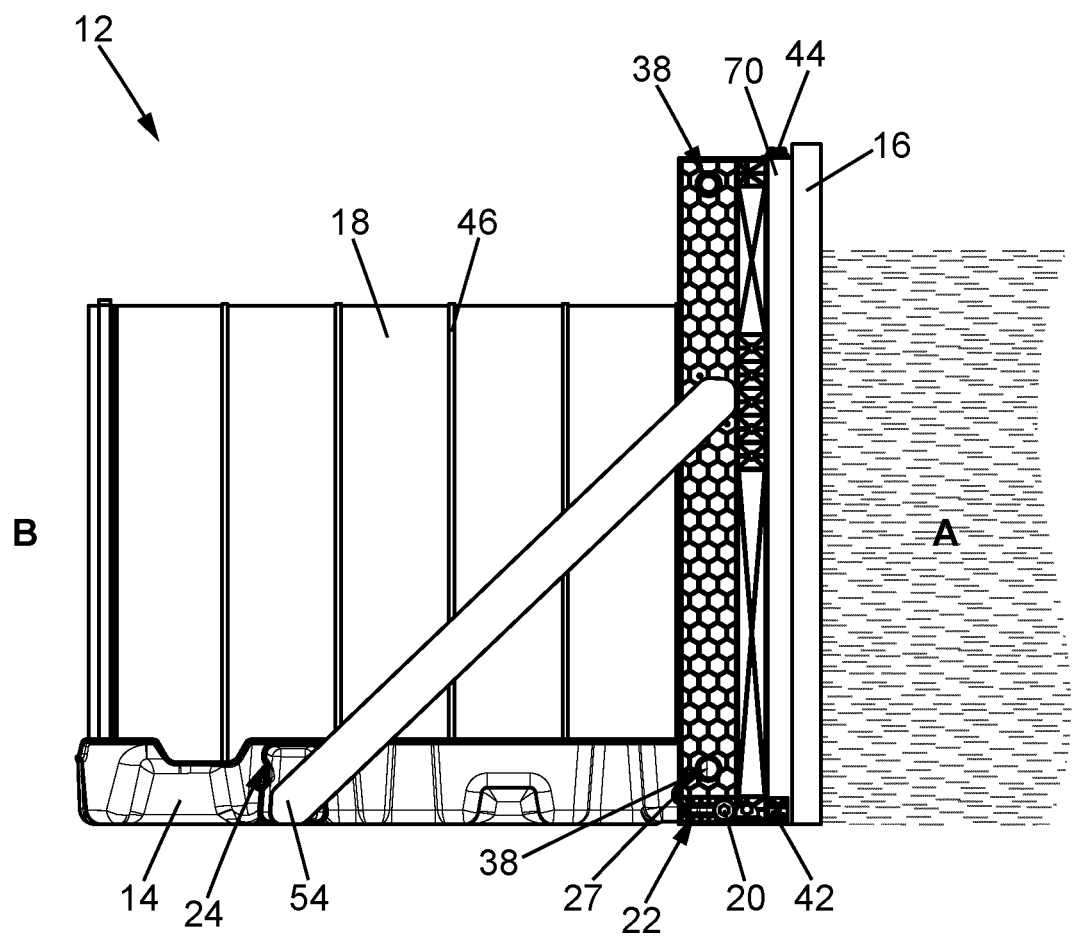
FIG. 2 is a side view of a module adapted to form the protective barrier of FIG. 1 in a working position, according to an embodiment.

FIG. 2 illustrates a module 12 in the working position, wherein water is retained at a front side A of the module 12, and a rear side B is protected. The base 14 extends parallel to the ground to anchor and weigh the module 12 to the ground, so that the module 12 can be held in place even when liquid is applying pressure on the frontside A of the module 12. The retention member 16 extends vertically relative to the base 14 to retain liquid at the frontside A of the module 12. The waterbag 18 is configured to be filled with liquid, to participate in the stability and anchoring of the module 12.

Figure 3:
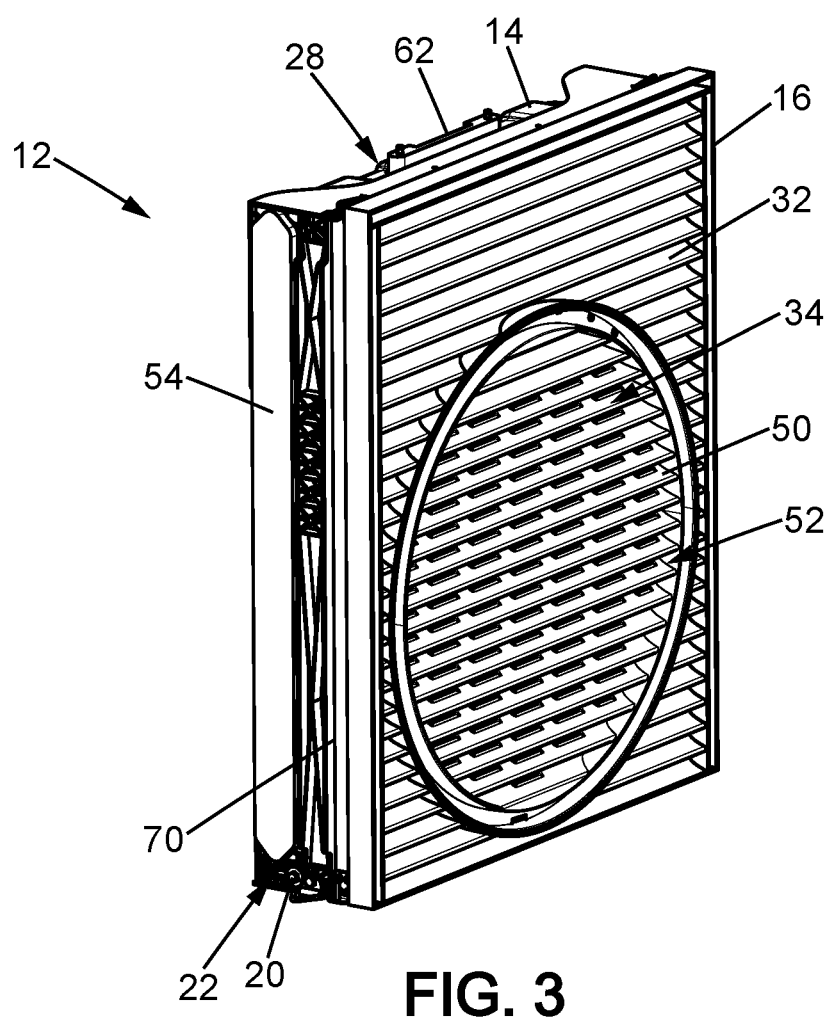
FIG. 3 is a perspective view of the module of FIG. 2 in a stowed position, according to an embodiment.

FIG. 3 illustrates a module 12 in the stowed position, such as during storage or transport. The module 12 can be disassembled and arranged to form a box. The box is formed by the base 14 and the retention member 16, wherein the retention member 12 extends generally parallel to the base 14. The box defines an interior cavity where the waterbag 18 may be stored. The waterbag 18 may be folded into the box, without dismantling the waterbag 18 from the module 12. Other components of the module 12 may also be stored. Thus, the module 12 may form a compact and practical structure for storage and transport. Loss of components forming the module 12 during transport or storage may be prevented.

In the illustrated example, the retention member 16 encloses the base 14 in the stowed position. In other words the base 14 is fitted inside the retention member 16 when the module 12 is in the stowed position. However, alternatively, the base 14 may enclose the retention member 16 in the stowed position, and the retention member 16 may be fitted inside the base 14.

Here, the retention member 16 is mounted to the base 14 via a slide and pivot joint. In other words, the articulation between the base 14 and the retention member 16 allows for rotation and linear motion in one direction. Change from the working position to the stowed position is a slide and pivot motion. The base 14 may be pulled out from the retention member 16, and rotated relative to the retention member 16. Such a motion is quick and simple, so that the module 12 may be promptly deployed in emergency situations.

The components of the module 12 will now be described in more detail.

1) Base 14

Figure 4:
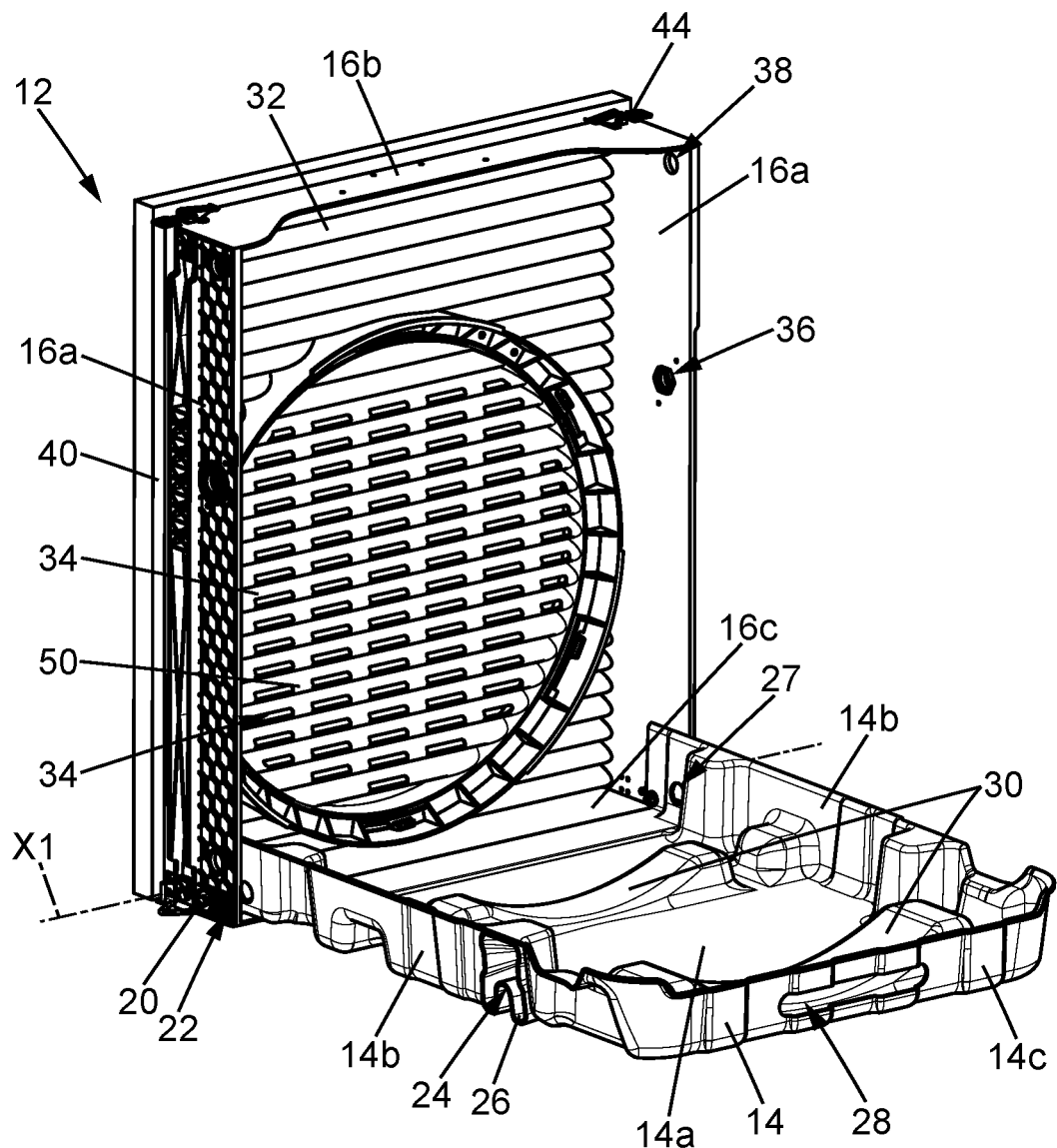
FIG. 4 is a perspective view of a subassembly of the module of FIG. 2, according to an embodiment.

As more visible on FIG. 4, the base 14 is a hollow, boxed shaped structure. The base 14 comprises a bottom surface 14a destined to be in contact with the ground, two side walls 14b and a rear wall 14c extending vertically from the edges of the bottom surface 14a.

Here, the bottom surface 14a is parallelepipedic, in particular rectangular. Such a bottom surface 14a provides a good contact area between the base 14 and the ground. However, the bottom surface 14a may be square, or any other shape. In some examples, gripping means, such as rugosities, may protrude from the bottom surface 14a of the base 14 to improve friction between the base 14 and the ground.

The side walls 14b of the base 14 may provide mounting and support means for other components of the module 12.

Figure 5A:
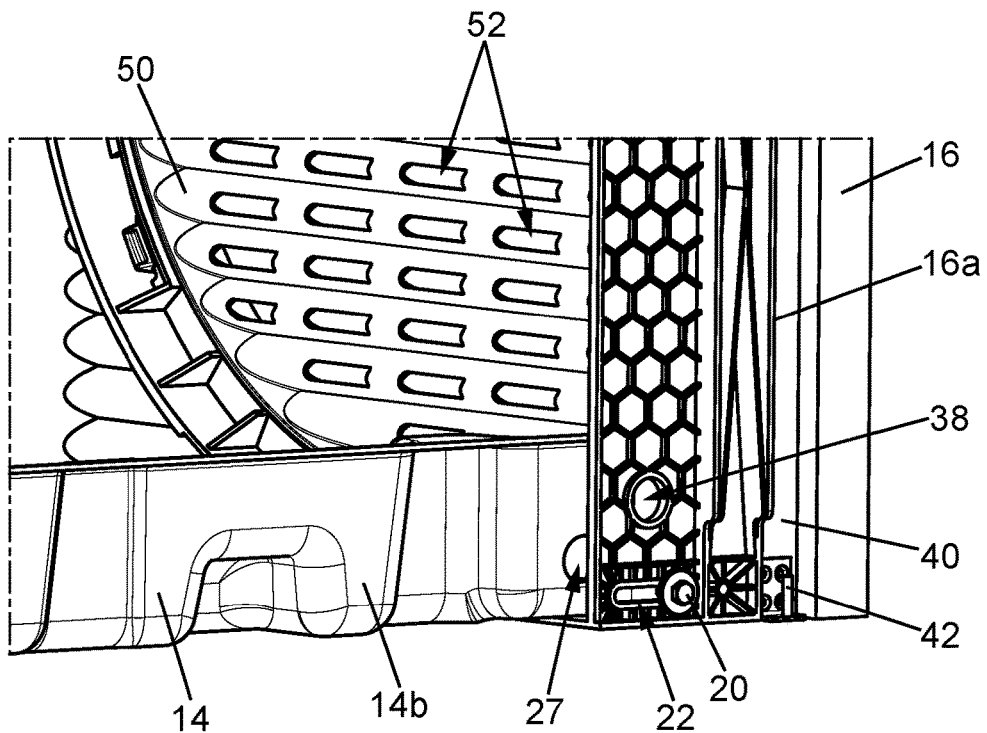
FIG. 5A is a detailed view of the subassembly of FIG. 4 in the working position, according to an embodiment.
Figure 5B:
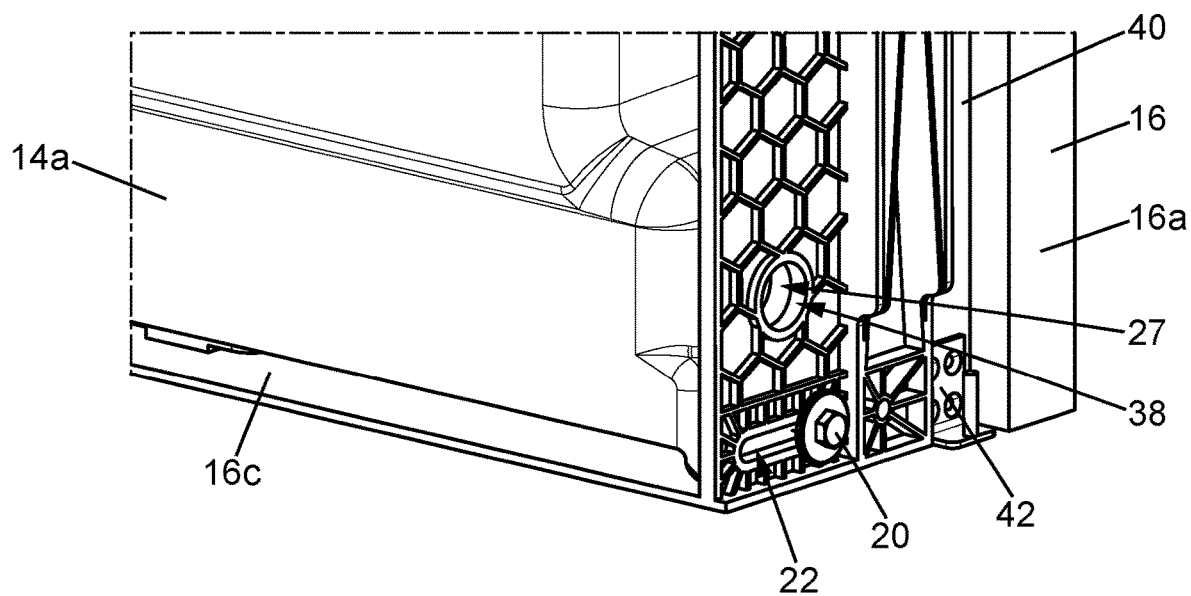
FIG. 5B is another detailed view of the subassembly of FIG. 4 in the stowed position, according to an embodiment.

In particular, as more visible on FIGS. 5a and 5b, a front extremity of each side wall 14b (distant from the rear wall 14c) comprises a pin 20 adapted to be clipped into elongated holes 22 formed in the retention member 16. The pins 20 enable rotational motion of the base 14 relative to the retention member 16. The rotational motion may be around an axis X1 extending across the base 14, normal to the side walls 14b. The pin 20 may for example be inserted into an orifice of the side wall 14b and locked onto the base 14 by a nut. Such a pin 20 may be easily fixed to the side wall 14b after the base 14 is manufactured, for example by injection molding or thermoforming.

Each side wall 14b may also comprise a recess 24 adapted to receive a supportleg 54 of the module 12 when the module 12 is in the working position. In some examples, an insert 26 may be provided in the recess 24 to increase the rigidity of the side wall 14b around the recess 24. The insert 26 may protect the base 14 from damage in case of an impact on the module 12. The base 14 may remain intact, and the insert 26 may be easily replaced.

Further, each side wall 14b may comprise a storage hole 27 adapted to receive a protrusion of the supportleg 54 when the module 12 is in the stowed position. The storage hole 27 may be aligned with a storage hole 38 formed in the retention member 16. The protrusion may thus extend through the base 14 and the retention member 16, participating in holding the module 12 in the stowed position.

The rear wall 14c of the base 14 may comprise a slot 28 adapted to receive a connecting plate 62. The connecting plate 62 may be stored in the box when the module 12 is in the stowed position by sliding the connecting plate 62 into the slot 28. Storing the connecting plate 62 in the box prevents the connecting plate 62 from being lost during storage or transport. Further, the slot 28 provides quick access to the connecting plate 62, participating in the fast assembly of the protective barrier 10. The slot 28 may also provide a handle for sliding and pivoting the base 14 relative to the retention member 16. In some examples, a clip may be provided to secure the connecting plate 62 once inserted in slot 28, preventing unintended removal of the connecting plate 62 during transport.

In addition, ribs 30 may extend across the base 14, between the two side walls 14b. The ribs 30 may provide support for the waterbag 18 when the module 12 is in the working position. The waterbag 18 may extend from the front of the base 14 (where the retention member 16 is mounted) to the rear wall 14c when the module 12 is in the working position and be supported by the ribs 30.

The base 14 may be formed in a strong plastic material, for example HOPE (High Density PolyEthylene), PVC (Polyvinyl Chloride), PP (Polypropylene), ABS (Acrylonitrile Butadiene Styrene) or equivalent. The base 14 may be formed by injection molding, thermoforming or any other suitable manufacturing process. The manufacture of the base 14 may therefore be relatively cheap and repeatable. The base 14 may be a sturdy and solid part while remaining relatively lightweight. The pins 20 and the insert 26 may be inserted after molding;

2) Retention Member 16

The retention member 16 is also a hollow box shaped structure comprising a wall 32, destined to come into contact with the liquid to be retained, an opening 34 for letting liquid pass there through, and four sides 16a, 16b, 16c extending vertically from the edges of the wall 32.

The wall 32 is a thin structure comprising v-shaped ribs. In the illustrated example, the wall 32 is formed by a series of v-shaped cross sections. However, the wall 32 could also comprise a smooth surface and the v-shaped ribs could protrude from the smooth surface. The v-shaped ribs are adapted to come into contact with the liquid to be retained, to generate disturbances in the liquid and/or the wind coming into contact with the wall 32, so that the force applied by the liquid and/or the wind is reduced.

The opening 34 is formed on a lower portion of the wall 32 of the retention member 16, wherein the lower portion of the wall 32 is a portion neighboring the ground when the module 12 is in the working position. An upper portion of the wall 32, opposite the lower portion, is a solid surface for providing rigidity to the retention member 16. The opening 34 illustrated is a circular opening, but the opening 34 may be any other shape.

Here, the four sides 16a, 16b, 16c of the retention member 16 enclose the base 14 when the module 12 is in the stowed position. The base 14 may be received inside the volume defined by the retention member 16 in the stowed position, forming a compact box (see FIG. 3).

The lateral sides 16a of the retention member 16, defined as the sides extending vertically from the ground when the module 12 is in the working position, provide mounting and/or storage means for other components of the module 12.

Each bottom extremity of the two lateral sides 16a (extremities neighboring the ground when the module 12 is in the working position) comprises the elongated hole 22 adapted to cooperate with the pin 20 mounted to the side wall 14b of the base 14. The elongated holes 22 enable rotational and linear motion in one direction of the base 14 relative to the retention member 16. The elongated holes 22 participate in the slide and pivot motion of the base 14 relative to the retention member 16. The elongated holes 22 are simple to manufacture, in particular when the retention member 16 is injection molded or thermoformed.

Each lateral side 16a may also comprise a mounting hole 36 and storage holes 38 destined to cooperate with a supportleg 54. The supportleg 54 may be screwed to the mounting hole 36 to provide rigidity to the module 12 in the working position. The supportleg 54 may be clipped and/or screwed to the storage holes 38 for storage when the module 12 is in the stowed position.

In addition, a groove 40 is formed in each lateral side 16a, to extend along the lateral side 16a. A connecting plate 62 may be inserted into the groove 40, to extend along the lateral side 16a of the module 12. Another module 12 may then be connected to the connecting plate 62.

The bottom and top sides 16b, 16c of the retention member 16, respectively defined as the side in proximity to the ground and the side distant from the ground when the module 12 is in the working position, may also comprise mounting and securing means, in particular for the connecting plate 62. As will be described later, a pin 42 may extend from the bottom side 16c, parallel to the lateral sides 16b, to cooperate with the connecting plate 62 and form a pivot joint with the connecting plate 62. A pressure latch 44 may be mounted on the top side 16b of the retention member 16, to lock the connecting plate 62 in place. The connecting plate 62 may be pivoted in a direction parallel to the lateral sides 16a of the retention member 16, and then locked in place when the connecting plate 62 is in a desired orientation.

In some examples, each side 16a, 16b, 16c of the retention member 16 may comprise handles. The handles may enable easy manipulation of the module 12 during storage and transport. The handles may also be used to switch the module 12 between the working and the stowed positions.

The retention member 16 may be formed in a strong plastic material, for example HOPE (High Density PolyEthylene), PVC (Polyvinyl Chloride), PP (Polypropylene), ABS (Acrylonitrile Butadiene Styrene) or equivalent. The retention member 16 may be formed by injection molding, thermoforming, or any other suitable process. The manufacture of the retention member 16 may also be cheap and repeatable. The overall module 12 may remain relatively lightweight. Mounting and securing means, such as a thread in mounting hole 36, pin 42 and pressure latch 44 may be fixed to the retention member 16 after molding.

3) Waterbag 18

Figure 6A:
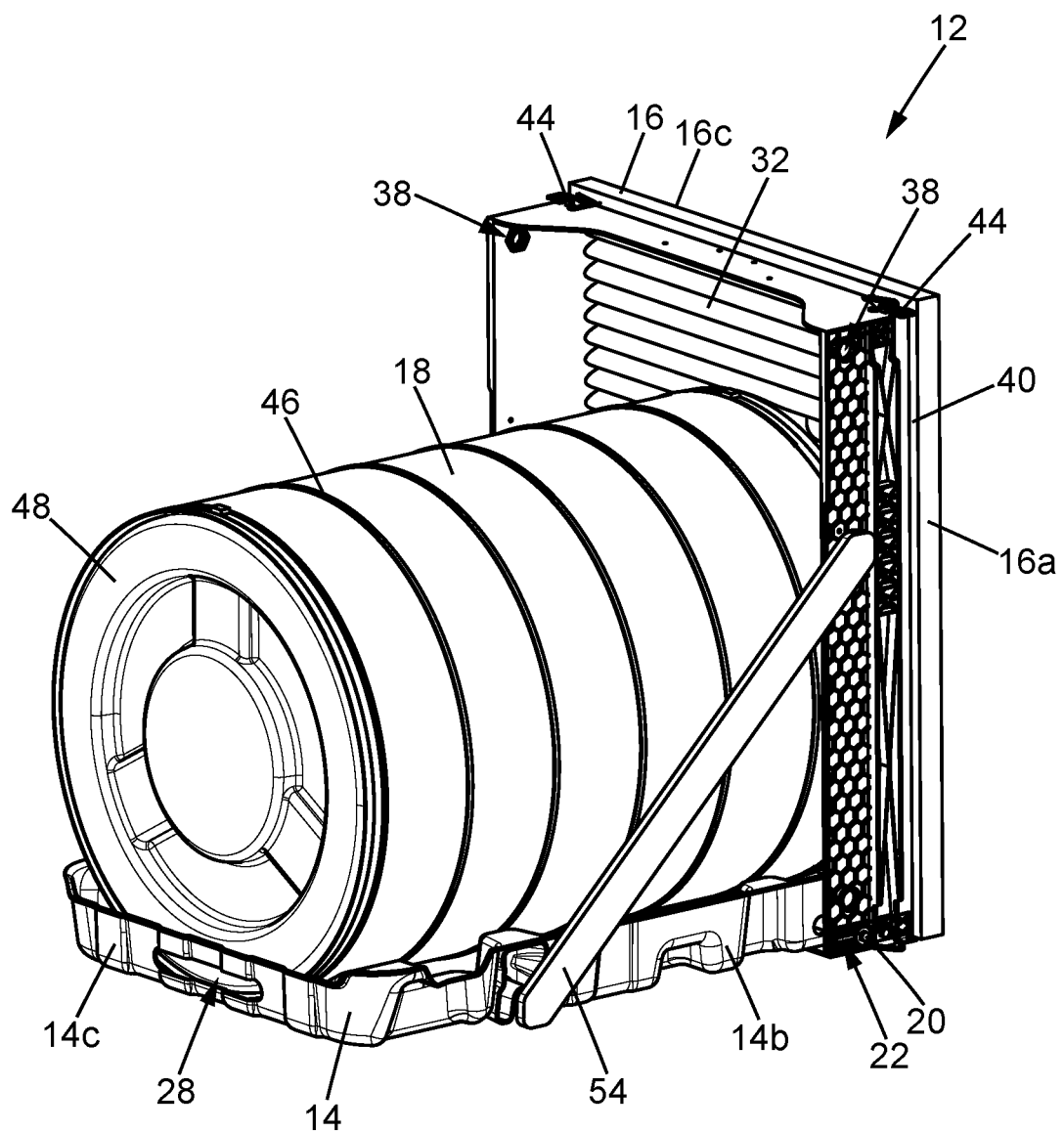
FIG. 6A is a perspective view of a module adapted to form the protective barrier of FIG. 1 with an extended waterbag, according to an embodiment.
Figure 6B:
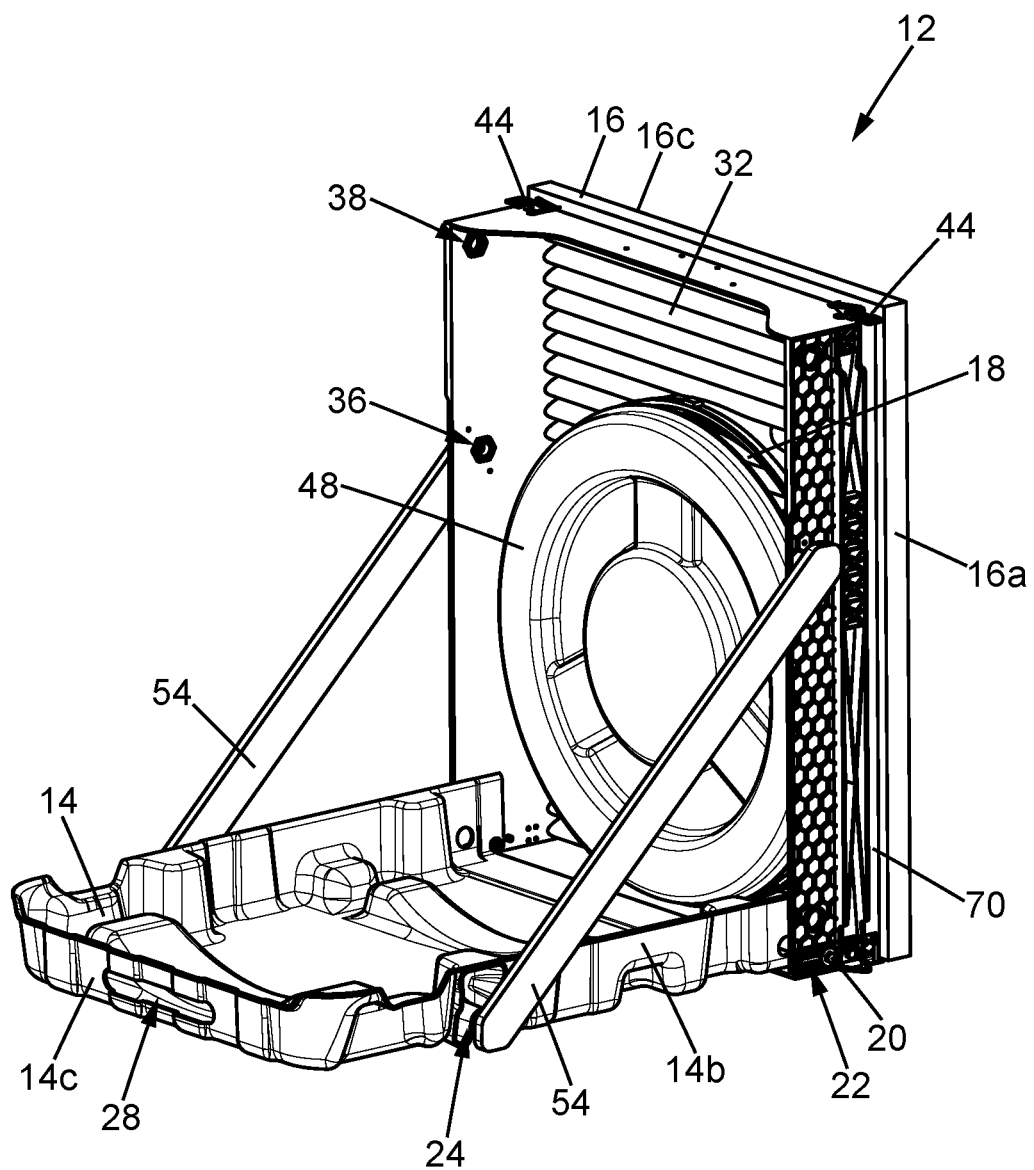
FIG. 6B is a perspective view of the module of FIG. 6A with a compressed waterbag, according to an embodiment.

The waterbag 18 is a flexible structure fixed to the retention member 16 to surround the opening 34. As illustrated in FIG. 6A, the waterbag 18 may be deployed when the module 12 is in the working position, to receive water passing though the opening 34. The waterbag 18 may extend along the base 14, for example by being supported by the ribs 30 formed in the base 14. The waterbag 18 provides stability and anchoring to the module 12 in the working position. As illustrated in FIG. 6b, the waterbag 18 may be pushed against the retention member 16 to be fitted inside the box. When the module 12 is switched from the working to the stowed position, the waterbag 18 may be compressed towards the retention member 16. Fitting the waterbag 18 into the box is simple, and does not require dismantling of the waterbag 18 from the retention member 16.

In the illustrated example, the waterbag 18 is cylindrical. Such a shape enables for reliable folding of the waterbag 18 when the module 12 is moved to the stowed position. Alternatively, the waterbag 18 may be any other shape suited to surround the opening 34 and be stored inside the box.

The waterbag 18 may be embedded with one or more reinforcements 46. The reinforcement 46 may for example be a metallic wire providing rigidity to the waterbag 18. The reinforcement 46 participates in the satisfactory folding of the waterbag 18 into the module 12. When the waterbag 18 is cylindrical, the reinforcement 46 may be an arcuate member, for example a spiral reinforcement, to further improve rigidity and reliable folding of the waterbag 18.

A rear plate 48 may be mounted on the rear end of the waterbag 18, distant from the retention member 16. The rear plate 48 may provide a communication area and options for implementing to the module 12. For example, the rear plate 48 may be used for fitting valves, pipes, or sensors. The rear plate 48 may be removably mounted to the rear end of the waterbag 18, so that the rear plate 48 may be removed and the rear end may be connected to another waterbag 18, providing an extension to the module 12.

As illustrated on FIG. 6B, the rear plate 48 may be pushed towards the retention member 16 when the waterbag 18 is compressed. The rear plate 48 may be stored inside the box when the module 12 is in the stowed position, as a result of compressing the waterbag 18. The rear plate 48 does not need to be dismantled from the waterbag 18 when the module is switched from the working position to the stowed position.

In some examples, the waterbag 18 and the rear plate 48 may be mounted to the retention member 16 and to the rear end of the waterbag 18 respectively by encircling. Encircling may consist in a metallic strip firmly constraining the waterbag 18 to the retention member 16 and the rear plate 48 to the waterbag 18.

4) Grate 50

As visible on FIGS. 3 and 4, a grate 50 may be mounted to the retention member 16 to surround the opening 34 of the retention member 16. In the illustrated example, the grate 50 is a circular or discoid grate 50 fitted into the opening 34. The grate 50 prevents objects carried by the liquid to pass through the opening 34 of the retention member 16 and flow into the waterbag 18.

The grate 50 may be rotatably mounted so as to be removed by rotation of the grate 50 relative to the retention member 16. For example, the grate 50 may be removed by a quarter turn of the grate 50 relative to the retention member 16. Removal of the grate 50 gives access to the waterbag 18, for example for cleaning purposes. In some examples, the grate 50 may comprise a locking mechanism to prevent accidental removal of the grate 50 when the module 12 is in the working position. The locking mechanism may be released by an adapted tool.

The grate 50 may comprise a series of v-shaped bars. Each bar may be separated by a space for letting water flow through the opening 34. A bottom of each "v" may be oriented towards the waterbag 18 when the grate 50 is mounted to the retention member 16. Thus, the v-shapes may participate in the draining of the waterbag 18 after use.

Alternatively, the grate 50 may be formed as a continuous surface. The cross section of the grate 50 may be a continuous series of "v" shapes. Apertures 52 may be formed at the bottom of each "v" (oriented towards the waterbag 18 when the grate 50 is mounted to the retention member 16) to allow water through the opening 34. A top portion of the grate 50 may comprise small holes to evacuate the air trapped in the waterbag 18 whilst water flows through apertures 52. The filling of the waterbag 18 may be improved, and any buoyancy of the waterbag 18 may be avoided.

5) Support Legs 54

As illustrated, the module 12 may also comprise one or more support legs 54. In the illustrated example, the module 12 comprises two support legs 54. The support legs 54 may be bars adapted to extend between the base 14 and the retention member 16 when the module 12 is in the working position. For example, a support bar 54 may be provided on either side of the waterbag 18. The support legs 54 provide additional rigidity to the module 12 in the working position. The support legs 54 are also adapted to be attached to the lateral sides 16a of the retention member 16 to extend along the lateral side 16a. The support legs 54 may be secured to the box when the module 12 is in the stowed position, preventing loss of the support legs 54 during storage or transport.

In the illustrated example, a first extremity of each supportleg 54 comprises a protrusion adapted to be clipped into the recess 24 formed in the side wall 14b of the base 14 and into the storage holes 27, 38 formed in the base 14 and the retention member 16. When the module 12 is in the working position, the protrusion may be clipped into the recess 24. When the module 12 is in the stowed position, the protrusion may extend through the retention member 16 and the base 14 (via storage holes 27, 38). The protrusion may participate in locking the module 12 in the stowed position.

The opposite extremity of the supportleg 54 may comprise a screw adapted for fixing the supportleg 54 to the mounting hole 36 of the retention member 16 and for being inserted into another storage hole 38 formed in the retention member 16. The screw fixing provides secure mounting of the supportleg 54.

For example, support legs 54 can be made of light metal, such as aluminum, or strong plastic material, for example HOPE (High Density PolyEthylene), PVC (Polyvinyl Chloride), PP (Polypropylene), ABS (Acrylonitrile Butadiene Styrene) or equivalent. Support legs 54 may be cheap and easily sourced, without compromising the overall weight of the module 12;

6) Connecting Plate 62

Figure 7:
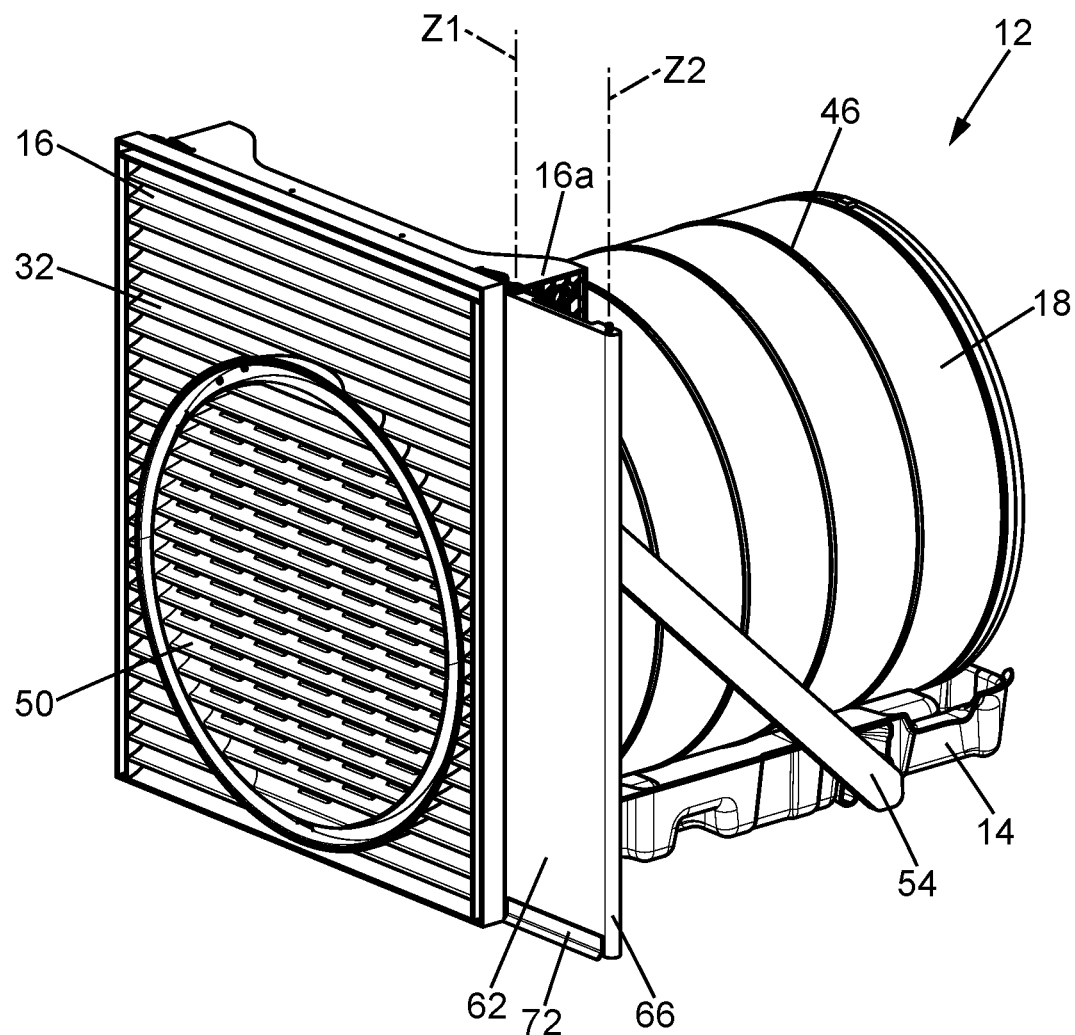
FIG. 7 is a perspective view of a module adapted to form the protective barrier of FIG. 1 comprising a connecting plate, according to an embodiment.

As more visible on FIG. 7, each module 12 may also comprise a connecting plate 62. The connecting plate 62 may be mounted to a lateral side 16a of the module 12 to extend along the lateral side 16a when the module 12 is in the working position. The connecting plate 62 may be used to attach the module 12 to another module 12. The connecting plate 62 may also provide an interface for mounting sensors and/or valves. Sensor/valve integration or replacement may be facilitated when they are mounted to the connecting plate 62

The connecting plate 62 is a generally flat plate. However, alternatively, the connecting plate 62 may comprise v-shaped ribs adapted to come into contact with the liquid to be retained, to generate disturbances in the liquid and/or the wind coming into contact with the wall 32, so that the force applied by the liquid and/or the wind is reduced.

The connecting plate 62 is mounted to the lateral side 16a of the retention member 16 to be rotatable in a direction Z1 parallel to the lateral side 16a. Modules 12 may be connected to form a barrier 10 adapted to the specific area to be protected. When two modules 12 are joined together by the connecting plate 62, there is a first rotational articulation in direction Z1 parallel to the lateral side 16a of a first module 12 and a second rotational articulation in direction Z2 parallel to the lateral side 16a of a second module 12. The double articulation provides flexibility in the orientation of the first module 12 relative to the second module 12.

Figure 8A:
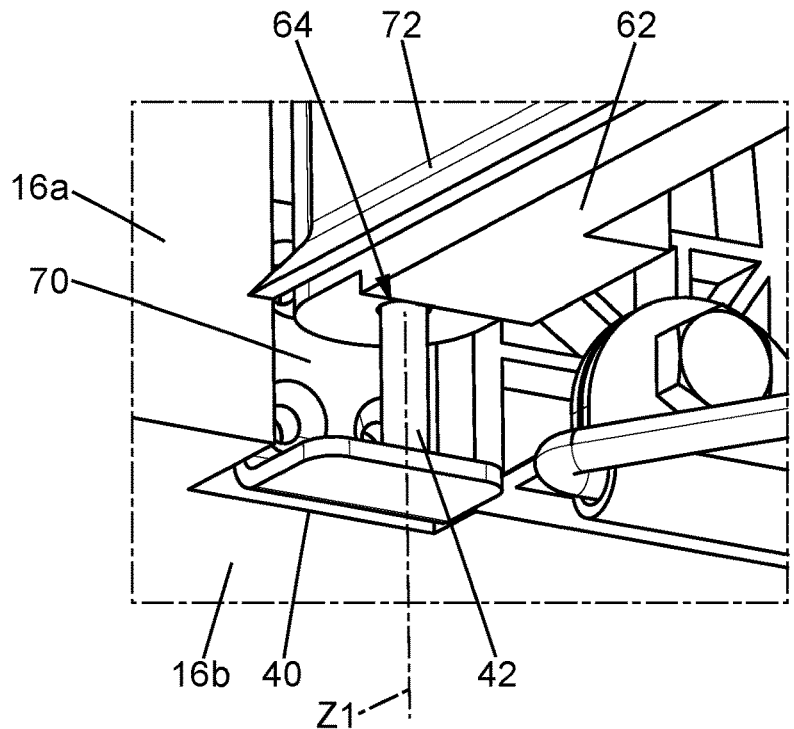
FIG. 8A is a detail of the mounting of the connecting plate of the module of FIG. 7, according to an embodiment.

As visible on FIG. 8A, a bottom surface of the connecting plate 62 (destined to be close to the ground) comprises a hole 64 in which can be inserted in the pin 42 protruding from the bottom side 16b of the retention member 16 to form a pivot joint with the retention member 16. Further, the connecting plate 62 comprises rounded edges 66 adapted to be inserted in the grooves 40 formed in either lateral side 16a of the retention member 16. The pivot joint and rounded edges enable rotation of the connecting plate 62 in the direction Z1 parallel to the lateral sides 16a. The angle formed by two retention members 16 of two connected modules 12 to be comprised between 90° and 195°.

Figure 8B:
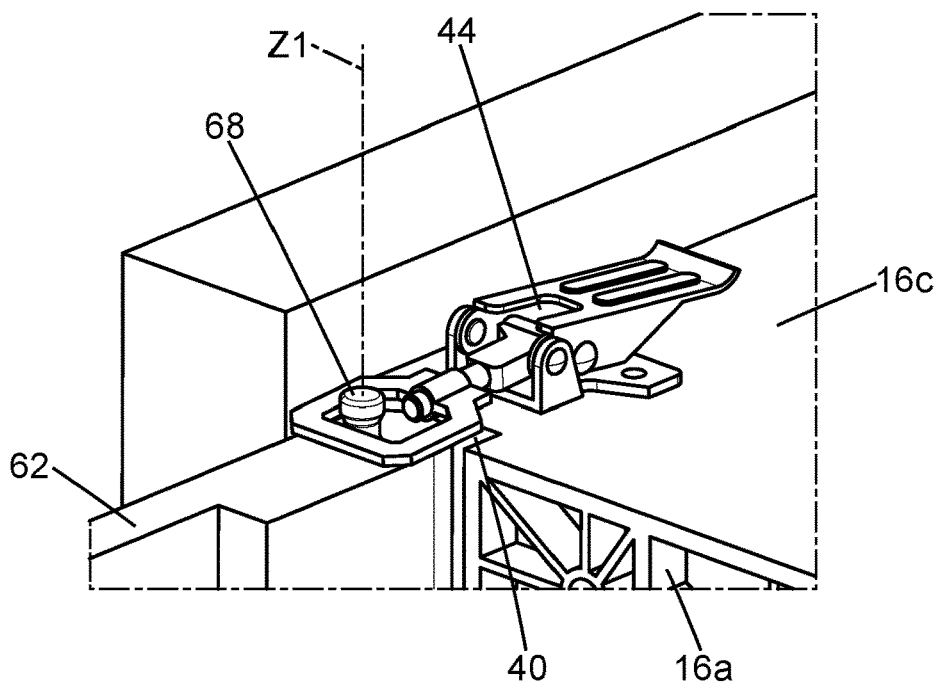
FIG. 8B is another detail of the mounting of the connecting plate of the module of FIG. 7, according to an embodiment.

As shown on FIG. 8B, a top surface of the connecting plate 62, opposite to the bottom surface, may comprise a pin 68 configured to engage with the pressure latch 44 on the top side 16c of the retention member 16. The pressure latch 44 may engage with the pin 68, to lock the connecting plate 62 in a desired orientation. The use of such a pressure latch 44 enables the locking of neighboring modules 12 to be more or less secure, so that a security system may be put in place. For example, the connecting plate 62 may be set to give way if the force exerted by incoming liquid exceeds a threshold.

As shown in FIG. 3, the connecting plate 62 may also be inserted and clipped into the slot 28 formed in the base 14 when the module 12 is in the stowed position. The connecting plate 62 may be stored in the box formed by the base 14 and the retention member 16 when the module 12 is in the stowed position. As mentioned above, storing the connecting plate 62 in the box prevents the connecting plate 62 from being lost during storage or transport.

The connecting plate 62 may be formed in a strong plastic material, for example HOPE (High Density PolyEthylene), PVC (Polyvinyl Chloride), PP (Polypropylene), ABS (Acrylonitrile Butadiene Styrene) or equivalent. The connecting plate 62 may be formed by injection molding, thermoforming, or any other suitable process.

In some examples, the module 12 may also comprise spacer. The spacer may cooperate with the pins 42 protruding from the bottom surface of two modules 12 intended to be fixed next to each other. The spacer may be slotted into the pins 42 to maintain a desired amount of space between the two modules 12 prior to mounting the connecting plate 62.

Alternatively, two neighboring modules 12 may be directly connected to one another. For example, a groove in a lateral side of a first module may be adapted to cooperate with a tongue formed in a lateral side of a second module.

7) Anchoring

Figure 9:
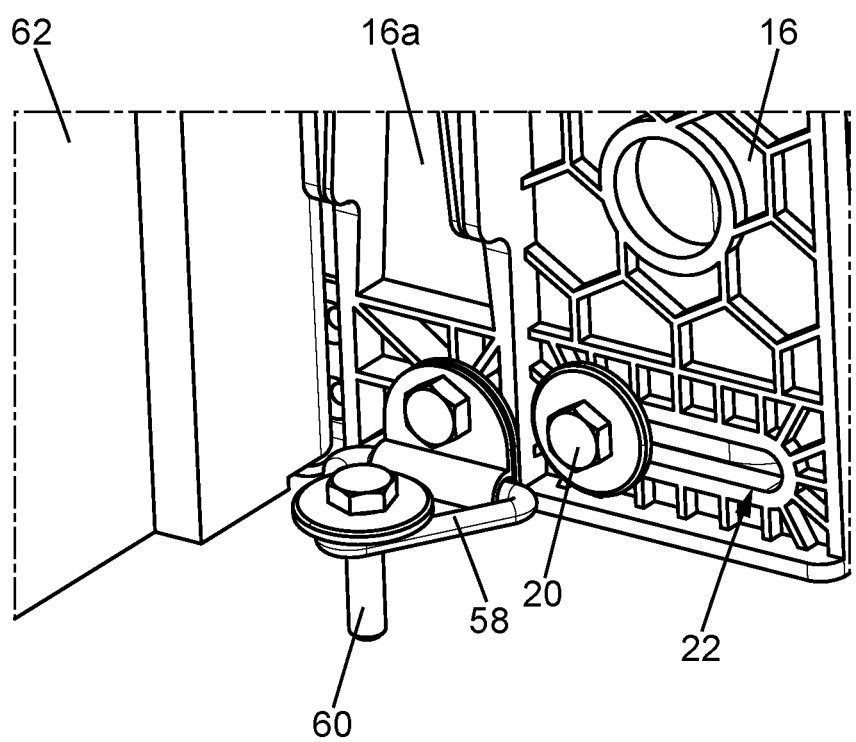
FIG. 9 is a perspective view of a detail of a module adapted to form the protective barrier of FIG. 1 comprising anchoring means, according to an embodiment.

Anchoring means may be provided on either side of the module 12. In the example of FIG. 9, a hook 58 may be fixed to each lateral side 16a of the retention member 16. An anchoring peg 60 may be passed through the hook 58 and be pushed into the ground. The use of the hook 58 may improve the insertion of the peg 60 into the ground, participating in the satisfactory anchoring of the module 12.

Alternatively or in addition, a wall joint may be mounted to either side of the retention member 16, to allow fixing of the module 12 to a wall or building.

8) Sealing

First sealing means 70 may extend within each groove 40 extending along the lateral sides 16a of the retention member 16. The first sealing means 70 may for example be rubber strips inserted into the grooves 40 formed in the lateral sides 16a. The first sealing means 70 may be compressed when a connecting place 62 is inserted in the groove 40, providing suitable sealing. Leakage of water between the retention member 16 and the connecting plate 62 may be prevented.

In addition, second sealing means 72 may extend along the bottom surface of the connecting plate 62, destined to be in contact with the ground when the module 12 is in the working position. The second sealing means 72 may be a rubber strip fixed to the bottom surface of the connecting plate 62. The second sealing means 72 prevent leakage of water to the rear side B of the module 12. The connection between modules 12 may be watertight.

In some examples, third sealing means may also extend along the bottom side 16b of the retention member 16. The third sealing means may also be a rubber strip extending along the bottom side 16b. The third sealing means prevent leakage of water from the frontside A of module 12 to the rear side B of module 12.

9) Alternative Embodiment

FIGS. 10 to 14 illustrate an alternative embodiment for the module 12 described above.

Figure 10:
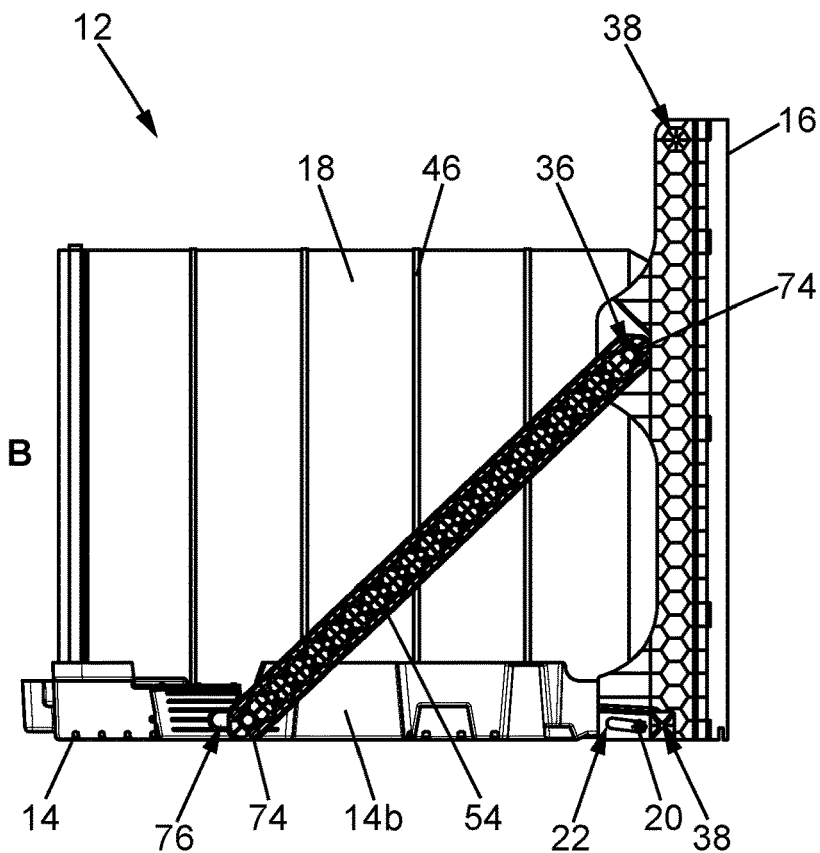
FIG. 10 is a side view of a second module adapted to form the protective barrier of FIG. 1 in a working position, according to another embodiment.

As shown on FIG. 10, in this embodiment, the supportleg 54 may be symmetrical about a cross sectional plane of the supportleg 54. Each extremity of the supportleg 54 may comprise a pin 74. In the working position, one pin 74 may be fitted to the mounting hole 36 formed in the lateral side 16a of the retention member 16 and another pin 74 may be inserted into an L shaped slot 76 formed in the side wall 14b of the base 14. In the stowed position, each pin 74 may be fitted into storage holes 38 of the retention member 16. The deployment and stowing of the module 12 may be facilitated, as the supportleg 54 may be mounted in any orientation.

Figure 11:
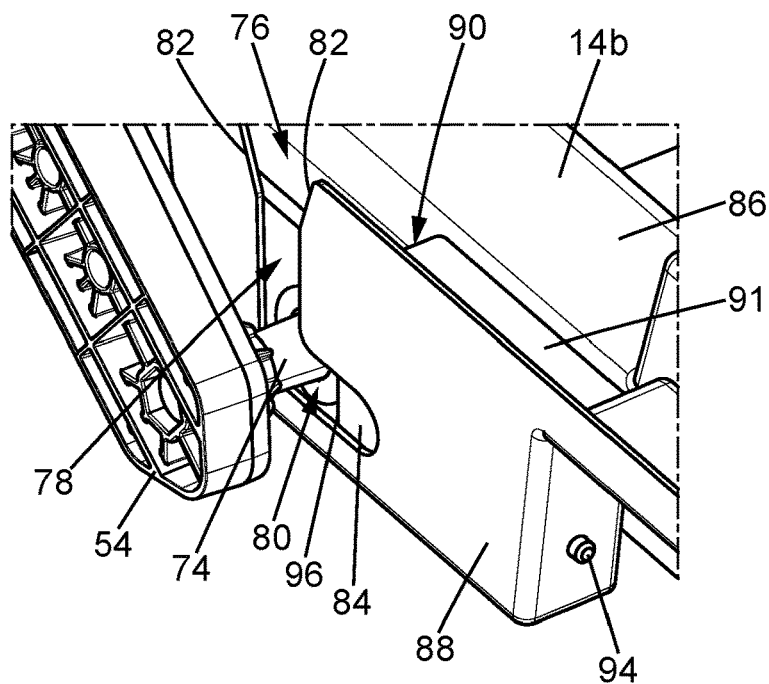
FIG. 11 is a perspective view of a detail of the module of FIG. 10 adapted to form the protective barrier of FIG. 1, according to an embodiment.

As more visible FIG. 11, the L shaped slot 76 comprises a vertical portion 78 extending from the edge of the side wall 14 towards the bottom surface 14a of the base 14. The vertical portion 78 is adapted to the insertion of the pin 74 of the support leg 54 when assembling the module 12 in the working position. The borders of the vertical portion 78 may comprise a chamfer 82 to facilitate insertion of the pin 74 into the vertical portion 78.

The L shaped slot 76 further comprises a horizontal portion 80 extending from the vertical portion 78 towards the rear wall 14c of the base 14. The horizontal portion 80 enables the pin 74 to translate parallel to the side wall 14c. The pin 74 may be elastically solicited by a biasing mechanism 84, as will be described in more detail below.

Further, the side wall 14b of the base 14 may comprise a main panel 86 and adjacent panel 88 extending parallel to the main panel 86 in the area where the supportleg 54 is to be mounted to the base 14. The L shaped slot 76 is formed on adjacent panel 88. The adjacent panel 88 may be of a smaller thickness than the main panel 86. The adjacent panel 88 therefore defines a weakened portion 88 of the side wall 14*b*. In case of an impact on the retention member 16, such as a tree trunk hitting the retention member 16, the weakened area 88 may break under the sudden load. The breakage provides damping and prevents damaging other parts of the module 12. Thus, the module 12 may still be operational following the impact.

The main panel 86 and adjacent panel 88 may define a recess 90 into which the biasing mechanism 84 may be mounted. The recess 90 may be closed at its top surface (opposite the bot tom wall 14*a*) by a lid 91 to protect the biasing mechanism 84.

Figure 12:
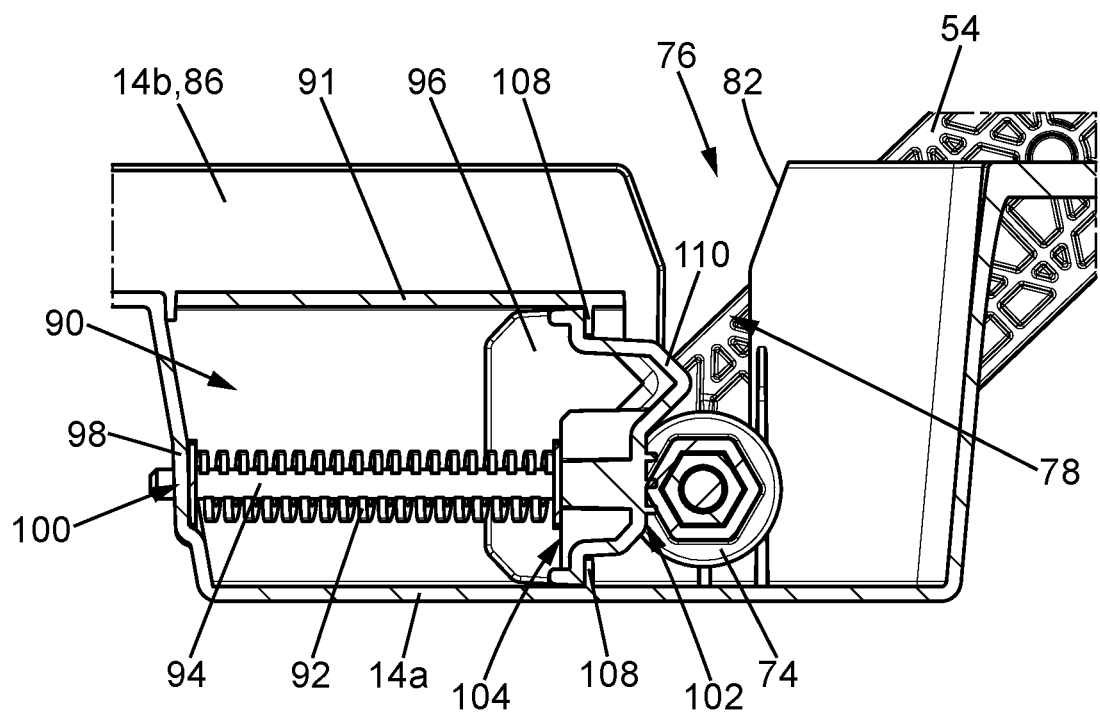
FIG. 12 is a side view of a cross section of the detail of FIG. 11, according to an embodiment.

Turning to FIG. 12, the biasing mechanism 84 comprises a spring 92, a slider 94 and a piston 96.

Figure 13:
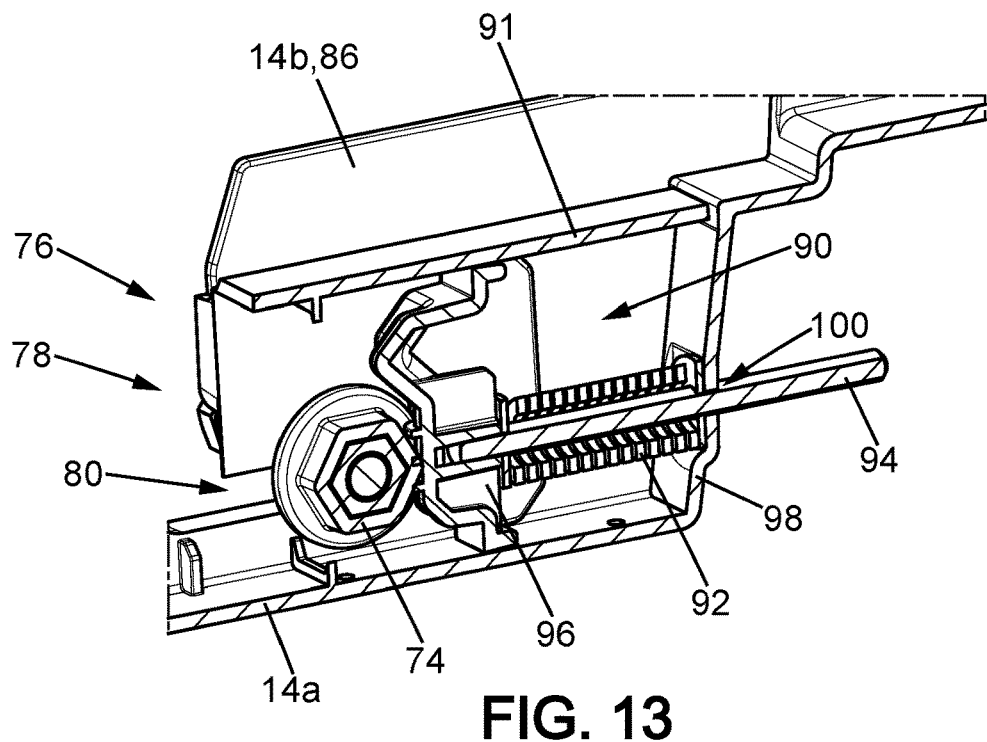
FIG. 13 is a perspective view of a cross section of the detail of FIG. 11, according to an embodiment.

The spring 92 presses against an abutment surface 98 formed at the rear end of the recess 90 and extends towards the L shaped slot 78. In the working position of the module 12, the spring may exert a force on the pin 74 of the supportleg 54, thereby acting on the supportleg 54 and, by extension, the retention member 16. When no force is applied on the retention member 16 (i.e. no liquid is acting on the retention member 16), the spring 92 may generate a forward inclination of the retention member 16 relative to the base 14. Such an inclination may prevent play due to the clearance between different parts. The inclination may also improve the sealing between the ground and the bottom side 16*b* of the retention member 16 (third sealing means). When liquid is acting on the retention member 16, the force provided by the liquid causes the support member 54 to push against the spring 92. The pin 74 may slide along horizontal portion 80 of the L shaped slot 76, securing the supportleg 54 in the horizontal portion 80 of the L shaped slot 76 and positioning the retention member 54 vertical to the ground (FIG. 13).

The slider 94 may be a rod extending through the spring 92 to maintain the spring 92 in position. An opening 100 may be provided in the abutment surface 98 to enable the slider 94 to protrude from the recess 90 when the spring 92 is compressed under the action of the pin 74 (FIG. 13).

Figure 14:
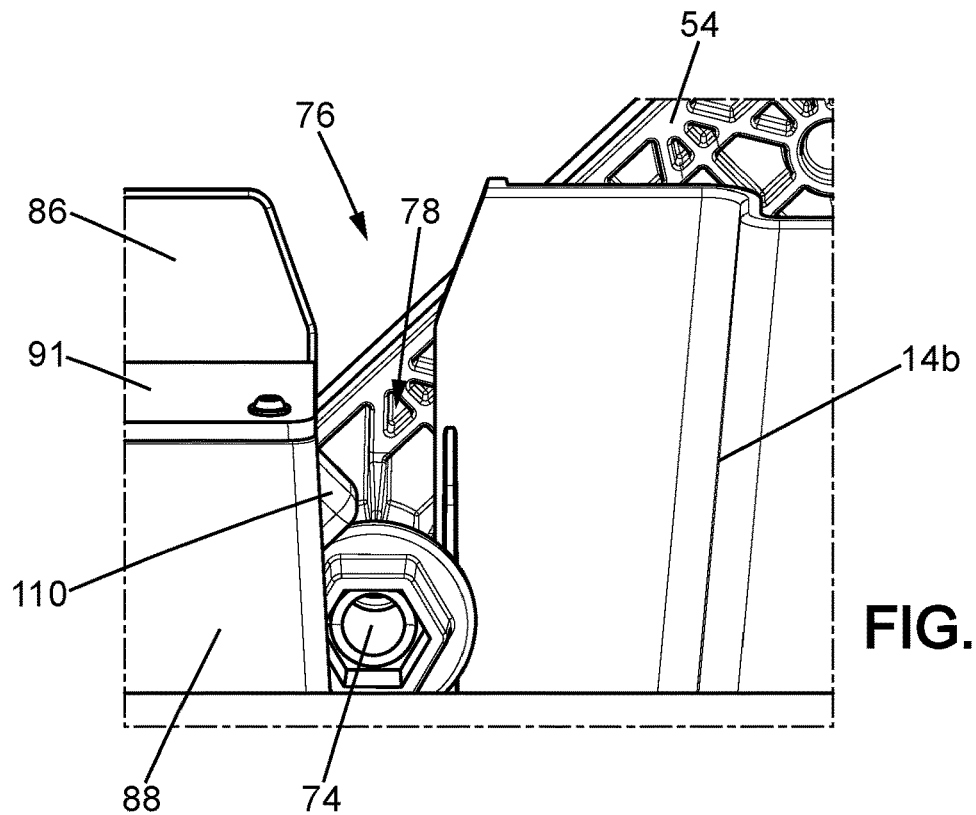
FIG. 14 is a side view of the detail of FIG. 11, according to an embodiment.

The piston 96 comprises a front surface 102 configured to contact the pin 74 of the support leg 54 and a rear surface 104 configured to contact the spring 92. The piston 96 may slide within the recess 90 due to the forces exerted by the pin 74 or the spring 92. The piston 96 provides an interface between the pin 74 and the spring 92. The lid 91 and the bottom wall 14*a* of the base 14 may comprise ridges 108 configured to stop the movement of the piston 96 under the action of the spring 92. In addition, the piston 96 may comprise a stopper 110 extending from the front surface 102 of the piston 92. The stopper 110 provides a bearing surface for the pin 74, preventing its accidental removal from the vertical portion 78 of L shape slot 76 in the working position (FIG. 14).

It should be noted that, in the illustrated embodiment, the biasing mechanism 84 comprises a spring 92. However, the biasing mechanism 84 could comprise any other elastic member 92 adapted to exert bias the pin 74 of the support member 54 towards the retention member 16. For example, the elastic member 92 may be shape memory foam or a hydraulic piston. 10) Deployment In the following, a method for moving the module 12 from the stowed position to the working position will be described in more detail.

Initially, the module 12 is in the stowed position. The retention member 16 and the base 14 form a box. In particular, the box is formed by the base 14 being fitted into the retention member 16. The waterbag 18 is compressed inside the box. The support legs 54 are clipped on either lateral side 16*a* of the retention member 16. The connecting plate 62 is stored in the slot 28 formed in the rear wall 14*c* of the base 14. The grate 50 may be attached to the opening 34 of the retention member 16. The components of the module 12 are attached to or stored in the box, preventing loss of components and facilitating storage and transport.

When the module 12 is to be used, the connecting plate 62 is removed from the slot 28 in the rear wall 14*c* of the base 14, by sliding the connecting plate 62 out of the slot 28. The connecting plate 62 may be inserted into one of the grooves 40 formed in the lateral sides 16*a* of the retention member 16. The hole 64 on the bottom of the connecting plate 62 may engage with the pin 42 extending from the bottom side 16*b* of the retention member 16. The connecting plate 62 may then be oriented in the desired orientation, depending on the shape of the modular barrier 10 to be erected. When the desired orientation is obtained, the pressure latch 44 may be engaged with the pin 68 formed on the top surface 16*c* of the connecting plate 62, to lock the connecting plate 62 in place.

The base 14 may be pulled out from the retention member 16. In particular, a user may grab the slot 28 formed in the rear wall 14*c* of the base 14 and rotate the base 14 relative to the retention member 16. When the retention member 16 extends vertically relative to the base 14, the base 14 may be pushed towards the retention member 16 until the pins 20 on each side wall 14*b* of the base 14 clip into the elongated holes 22 on each the lateral sides 16*a* of the retention member 16.

The support legs 54 may be unclipped from either lateral side 16*a* of the retention member 16. An extremity of each supportleg 54 may be clipped into the recess 24 formed in the side walls 14*b* of the base 14 and the other extremity of each supportleg 54 may be screwed to the mounting hole 36 formed in the lateral side 16*a* of the retention member 16.

In the alternative embodiment, the pins 74 of the support legs may be removed from the lateral sides 16*a* of the retention member 16. A pin 74 may be inserted into the mounting hole 36 formed in the lateral side 16*a* of the retention member 16 and a pin 74 may be inserted into the L shaped slot 76.

The waterbag 18 may be pulled out from the retention member 16, to extend along the base 14. It should be noted that no additional mounting of the waterbag 18 is involved.

The module 12 may be connected to another module 12 by the connecting plate 62 to form a protective barrier 10, by joining the connecting plate 62 to a lateral side 16*a* of a second module 12. Alternatively or in addition, the module 12 may be anchored to the ground by the anchoring means or mounted to a wall or building by the mounting point.

To move the module 12 from the working position to the stowed position, the steps described above may be performed in reverse.

The invention claimed is:

1. A module adapted to form a protective barrier against liquid runoff or flooding, the module being movable between a working position and a stowed position, the module comprising:
   a base adapted to anchor the module to the ground;
   a retention member comprising a wall adapted to retain liquid and an opening adapted to let liquid pass therethrough, wherein the retention member is mounted to the base to:

extend vertically relative to the base when the module is in the working position, and extend parallel to the base to form a box with the base when the module is in the stowed position;

a flexible waterbag fixed to the retention member, wherein:

the waterbag is supported by the base and adapted to receive liquid passing though the opening when the module is in the working position, the waterbag is contained in the box when the module is in the stowed position, and the waterbag is embedded with a reinforcement adapted to compress when the module is moved from the working position to the stowed position.

2. The module according to claim 1, wherein the retention member is at least rotatably mounted to the base.

3. The module according to claim 2, wherein the base comprises a pin configured to be clipped into an elongated hole of the retention member.

4. The module according to claim 1, wherein the waterbag is cylindrical, and the reinforcement is an arcuate member.

5. The module according to claim 1, wherein the wall of the retention member comprises v-shaped ribs adapted to come into contact with the liquid to be retained when the module is in the working position.

6. The module according to claim 1, further comprising a grate fitted in the opening of the retention member.

7. The module according to claim 6, wherein the grate is removably mounted to the opening.

8. The module according to claim 1, further comprising a rear plate removably mounted to an extremity of the waterbag distant from the retention member, wherein the rear plate is contained in in the box when the module is in the stowed position.

9. The module according to claim 1, further comprising a connecting plate, wherein:

the connecting plate is mounted to the retention member to extend along a lateral side of the retention member when the module is in the working position, and the connecting plate is adapted to fit into a slot formed in the base when the module is in the stowed position.

10. The module according to claim 9, wherein, in the working position, the connecting plate is rotatably mounted about an axis parallel to the lateral side of the retention member and the module further comprises a pressure latch adapted to lock the connecting plate in a desired orientation.

11. The module according to claim 9, further comprising at least one of first sealing means extending along the lateral side of the retention member and configured to be compressed by the connecting plate, second sealing means extending along an edge of the connecting plate configured to be compressed against the ground, and third sealing means extending along a side of the retention member configured to be in contact with the ground.

12. The module according to claim 1, further comprising at least one support leg, wherein, the support leg is mounted to the base and the retention member when the module is in the working position; and the support leg is mounted to a lateral side of the retention member to extend along the lateral side of the retention member when the module is in the stowed position.

13. The module according to claim 12, wherein the module further comprises a biasing mechanism mounted to the base, and the biasing mechanism comprises an elastic member configured to bias the support leg towards the retention member.

14. The module according to claim 12, wherein the support leg is symmetrical about a cross sectional plane of the support leg.

15. The module according to claim 12, wherein the base comprises a weakened portion onto which the support leg is mounted.

16. The module according claim 12, further comprising at least one of an anchoring hook arranged on a lateral side of the retention member and adapted to cooperate with an anchoring peg pushed into the ground and a wall joint arranged on a lateral side of the retention member and adapted to fix the module to a wall or building.

17. A protective barrier against liquid runoffs or floods, comprising two or more modules, each module being movable between a working position and a stowed position, each module comprising:

a base adapted to anchor the module to the ground;

a retention member comprising a wall for retaining liquid and an opening for letting liquid pass therethrough, wherein the retention member is mounted on the base to:

extend vertically relative to the base when the module is in the working position, and extend parallel to the base to form a box with the base when the module is in the stowed position;

a flexible waterbag fixed to the retention member, wherein:

the waterbag is supported by the base and adapted to receive liquid passing though the opening when the module is in the working position, and the waterbag is contained in the box when the module is in the stowed position;

a connecting plate mounted to the retention member to extend along a lateral side of the retention member when the module is in the working position and configured to connect the module to a second module when the module is in the working position; and a pressure latch adapted to lock the connecting plate in a desired orientation.

18. A module adapted to form a protective barrier against liquid runoff or flooding, the module being movable between a working position and a stowed position, the module comprising:

a base adapted to anchor the module to the ground;

a retention member comprising a wall adapted to retain liquid and an opening adapted to let liquid pass therethrough, wherein the retention member is mounted to the base to:

extend vertically relative to the base when the module is in the working position, and extend parallel to the base to form a box with the base when the module is in the stowed position;

a flexible waterbag fixed to the retention member, wherein:

the waterbag is supported by the base and adapted to receive liquid passing though the opening when the module is in the working position, and the waterbag is contained in the box when the module is in the stowed position; and a rear plate removably mounted to an extremity of the waterbag distant from the retention member.

* * * * *